US011212508B2

(12) United States Patent
Skotheim et al.

(10) Patent No.: US 11,212,508 B2
(45) Date of Patent: Dec. 28, 2021

(54) IMAGING UNIT AND SYSTEM FOR OBTAINING A THREE-DIMENSIONAL IMAGE

(71) Applicant: Zivid Labs AS, Oslo (NO)

(72) Inventors: Oystein Skotheim, Trondheim (NO); Henrik Schumann-Olsen, Oslo (NO)

(73) Assignee: Zivid AS, Oslo (NO)

( * ) Notice: Subject to any disclaimer, the term of this patent is extended or adjusted under 35 U.S.C. 154(b) by 360 days.

(21) Appl. No.: 16/071,067

(22) PCT Filed: Jan. 19, 2017

(86) PCT No.: PCT/EP2017/051106
§ 371 (c)(1),
(2) Date: Jul. 18, 2018

(87) PCT Pub. No.: WO2017/125507
PCT Pub. Date: Jul. 27, 2017

(65) Prior Publication Data
US 2020/0404242 A1 Dec. 24, 2020

(30) Foreign Application Priority Data

Jan. 19, 2016 (NO) .................................. 20160099

(51) Int. Cl.
H04N 13/204 (2018.01)
H04N 13/257 (2018.01)
(Continued)

(52) U.S. Cl.
CPC ......... *H04N 13/204* (2018.05); *H04N 5/2256* (2013.01); *H04N 5/2258* (2013.01);
(Continued)

(58) Field of Classification Search
CPC . G06T 2207/10024; G06T 2207/10144; G06T 3/4015; G01B 11/25;
(Continued)

(56) References Cited

U.S. PATENT DOCUMENTS

2009/0046301 A1 2/2009 Asakura et al.
2010/0207938 A1* 8/2010 Yau ...................... G06T 1/0007
345/419

(Continued)

OTHER PUBLICATIONS

Geng, Jason, "Structured-light 3D Surface Imaging: a Tutorial," Advances in Optics and Photonics vol. 3, No. 2, Mar. 31, 2011, 33 pages.
(Continued)

Primary Examiner — Obafemi O Sosanya
(74) Attorney, Agent, or Firm — Foley & Lardner LLP

(57) ABSTRACT

Imaging unit for obtaining a three-dimensional image of an object area, comprising an image sensor constituted by a matrix of sensor elements and a focusing unit for providing an image of said object area on the image sensor, the matrix being covered by a color filter array, and a projection unit for projecting a predetermined pattern toward the object area, the focusing unit and the projection unit having optical axes differing with a known angle, wherein the projection unit is adapted to project a time sequence of patterns toward the object area, the pattern sequence being chosen so as to uniquely define a position along at least one axis perpendicular to the projection axis, over the period defined by the illumination, wherein each sensor element in said matrix is connected to a processing branch adapted to detect the variations in the illumination sequence measured at each sensor element, and calculating from the known angle between the projection and imaging axes, the position in the sensor matrix, and the illumination sequence detected at each sensor element, a three-dimensional coordinate of the (Continued)

imaged point on the surface of the object, and wherein the processing branch is adapted to sample at least one image of said image area and calculate a color image based on said color filter pattern for said at least one image.

8 Claims, 6 Drawing Sheets

(51) Int. Cl.
*H04N 5/225* (2006.01)
*H04N 9/04* (2006.01)
*H04N 9/09* (2006.01)
*H04N 13/00* (2018.01)

(52) U.S. Cl.
CPC ............ *H04N 9/0455* (2018.08); *H04N 9/09* (2013.01); *H04N 13/257* (2018.05); *H04N 2013/0081* (2013.01)

(58) Field of Classification Search
CPC ............ G01B 11/2513; H04N 5/2256; H04N 5/2258; H04N 13/204; H04N 13/257; H04N 9/0455; H04N 9/09; H04N 2013/0081

See application file for complete search history.

(56) References Cited

U.S. PATENT DOCUMENTS

| 2013/0188024 | A1 | 7/2013 | Givon |
| 2014/0240492 | A1 | 8/2014 | Lee |
| 2016/0139674 | A1* | 5/2016 | Watanabe ............. G06F 3/0425 345/156 |

OTHER PUBLICATIONS

International Preliminary Report on Patentability issued for PCT/EP2017/051106, dated Jul. 24, 2018, 12 pages.
International Search Report and Written Opinion issued for PCT/EP2017/051106, dated Mar. 30, 2017, 14 pages.
Norwegian Search Report and English translation of Feedback from the Norwegian Patent Council regarding Norwegian Patent Application 20160099, dated Aug. 18, 2016, 6 pages.
Skotheim et al., "Structured light projection for accurate 3D shape determination", Proc 12. Int. Conf. Exp. Mech, 2004.

* cited by examiner

Figure 1

IMAGING UNIT AND SYSTEM FOR OBTAINING A THREE-DIMENSIONAL IMAGE

CROSS-REFERENCE TO RELATED APPLICATIONS

The present application is a U.S. National Stage of International Application No. PCT/EP2017/051106 filed on Jan. 19, 2017, which claims the benefit of Norwegian Patent Application No. 20160099 filed on Jan. 19, 2016, the entire disclosures of all of which are incorporated herein by reference.

Embodiments of the invention relate to an imaging unit for obtaining a three-dimensional image of an object area using structured illumination projected onto the area.

Structured light is a fast and flexible optical method for measuring the three-dimensional shape of objects. One or more light patterns are projected onto the scene with a projector (e.g., video projector, slide projector, laser with diffractive optical element etc.) and observed with a camera placed at an angle with the projector as shown in FIG. 6 and discussed in more detail in the article by Ø. Skotheim, F. Couweleers, "Structured light projection for accurate 3D shape determination". Proceedings of the 12th International Conference on Experimental Mechanics, Bari, Italy (2004).

Because of the angle between the camera and the projector, the light patterns will appear distorted by the surfaces of the objects in the light path. By analyzing these distortions in software or hardware, the three-dimensional shape of the surfaces can be calculated very accurately and represented, for example, as a point cloud or a polygonal surface mesh.

There are several approaches to structured light imaging, depending on the type and number of projected patterns used. The number of projected patterns used is typically related to the system design and affects its complexity and cost. For instance, if only one static pattern is used, as in the Microsoft Kinect®, information is extracted from a small neighborhood around each pixel in order to determine 3D depth for the neighborhood. Using neighborhoods of pixels has significant disadvantages if the objective is high-resolution imaging, as it implies that depth is representative for a neighborhood of pixels rather than for each pixel by itself (i.e. the resolution is lower). If more than one projected pattern is available, one can avoid the use of a spatial neighborhood altogether and instead utilize temporal information only, meaning that 3D depth is calculated independently and at each pixel, by sampling information specific to one pixel at different instances in time. Such approaches will be referred to as time-multiplexed structured light methods.

Examples of two popular methods for time-multiplexed structured light are: Gray code (based on binary patterns, see G. Sansoni, S. Corini, S. Lazzari, R. Rodella and F. Docchio, "Three-dimensional imaging based on Gray-code light projection: characterization of the measuring algorithm and development of a measuring system for industrial applications". Applied Optics Vol. 36 No. 19 (1997)) and phase stepping (based on sinusoidal patterns, see e.g. C. Reich, R. Ritter, J. Thesing, "3-D shape measurement of complex objects by combining photogrammetry and fringe projection". Optical Engineering Vol 39 (1), 2000. Various other methods also exist that either combine Gray code and phase stepping, as discussed in G. Sansoni, M. Carocci and R. Rodella, "Three-dimensional vision based on a combination of Gray-code and phase-shift light projection: analysis and compensation of the systematic errors", Applied Optics, 38, 6565-6573, 1999, or use phase stepping with two or more spatial frequencies as discussed in Ø. Skotheim, H. Schumann-Olsen, M. Lacolle, K. Haugholt, J. Thorstensen, A. Kim and T. Bakke., "A real-time 3D range image sensor based on a novel tip-tilt-piston micromirror and dual frequency phase shifting". IS&T/SPIE Electronic Imaging 2015. See J. Salvi, J. Pagés, J. Batlle, "Pattern codification strategies in structured light systems", Pattern Recognition Vol. 37 (4), 2004 for a survey of different structured light methods.

Although real time 3D cameras have existed for some time, present solutions typically have a resolution in the millimeter to centimeter range. An example is the first generation of Microsoft Kinect®, which is based on structured light with a static pattern, and also a variety of Time-of-Flight (ToF) cameras, which measure the time delay between emitted and observed light. Such cameras are not accurate enough to be used in many industrial applications, such as e.g. in-line inspection of 3D shape in production lines, or in robot guidance or machine vision applications requiring sub-millimeter accuracy. Adding color measurements to the imaging system increases complexity and the number of calculations required even further, and thus either reduces the resolution that can be obtained with a given system with a given computational constraint, or alternatively, increases the calculation requirements and thus the overall system cost.

Generally, optical systems have significant advantages—mainly in terms of resolution and accuracy—over other methods for 3D inspection and imaging, such as capacitive and ultrasonic (SONAR) systems and radio-based (RADAR) imaging systems.

However, despite many different optical technologies to choose between, there are still several challenges that limit their practical applicability. A particular nuisance is the unwanted compromises that typically have to be made on key specifications such as speed, resolution, accuracy, field-of-view, color and price. In short, high-speed 3D cameras tend to have low resolution (typically in the order of a centimeter). Stereo cameras, time-of-flight cameras and structured light cameras based on one static pattern typically fall into this category. On the other hand, 3D cameras (or 3D scanners) with high accuracy and sub-millimeter resolution are often slow and expensive. Most laser scanners (e.g. LIDARs) and time-multiplexed structured light scanners fall into this category. Additionally, in order for optical systems to perform well, they tend to require high system complexity, high processing requirements, high system bus bandwidth, high power consumption or all of the above, which typically result in a high system cost. Several inventive approaches have been pursued to improve the resolution and accuracy of optical systems without compromising too much on cost and system complexity. One recent example is the work on polarized 3D imaging that was recently presented by MIT Media Lab: Kadambi, Achuta, et al.: "Polarized 3D: High-Quality Depth Sensing with Polarization Cues." Proceedings of the IEEE International Conference on Computer Vision 2015, where the accuracy of depth maps from a Microsoft Kinect is significantly increased by adding polarization filters to the system. The implementation of polarization filters does however increase processing requirements and complexity of the system, which in turn decreases the speed. In the same manner, it is an objective of the present invention to provide a solution being capable of real time monitoring of both 3D shape and color of an area, e.g. a production line system, with sub-millimeter accuracy that can be realized within reasonable cost and power consumption. This is obtained with an imaging unit and a corresponding system as specified in the accompanying claims.

Embodiments of the present invention realize that the shape of an illuminated object may be found directly from the raw, unfiltered image data from a color image sensor during the projection of a time-multiplexed structured light pattern sequence, while simply ignoring the fact that the light detected at each pixel has also passed through a spatially local color filter. This is done by shortcutting the conventional signal processing pipeline between a color camera and a CPU or GPU responsible for depth determination, i.e. by omitting the filtering operations needed to determine full color images from the raw image data for most of the images in the sequence. The color information may be extracted more seldom, e.g. only once for each projected sequence of structured light patterns.

Specifically, it is known that color image sensors are provided with a color filter array (CFA), usually a so called "Bayer matrix" described in U.S. Pat. No. 3,971,065, having a pattern of red, green and blue filters. An example of such a color filter array is shown in FIG. 1. The Bayer matrix in this example has a green color filter in front of 50% of the pixels, a red color filter in front of 25% of the pixels and a blue color filter in front of 25% of the pixels. Moreover, the Bayer filter employs a spatially local filter operation that improves the overall color quality extraction of the image at the cost of the potential for accurate depth estimation.

Alternatively, or additionally, other filter patterns may be used, such as the EXR or X-trans filters of Fujifilm. Other examples of filters are discussed in US2007/0024931, U.S. Pat. No. 7,821,553 and WO2013187001. Even more specialized filtering approaches targeting infrared or other types of spectral imaging can also be employed.

As a non-limiting example, for an image sensor provided with a Bayer matrix, each pixel is filtered to record only one of three colors. An interpolation operation is usually carried out in order to estimate a set of complete red, green and blue values for each pixel and hence obtain a full-color image with full resolution. For example, if a pixel is covered by a red color filter, a spatial neighborhood of surrounding pixels has to be examined in order to estimate the green and blue color values for this pixel.

Such an interpolation operation is usually referred to as CFA demosaicking or Bayer demosaicking. The software connected to the sensor is typically designed to carry out such a demosaicking operation as an integrated part of the conventional image acquisition pipeline. Since the interpolation operation is a form of averaging, it will actually smear out and degrade the "per-pixel" image quality, especially in situations where only the intensity in each pixel is of interest, and in situations where the color information is not needed. In short, the overall, perceived image quality is enhanced by Bayer demosaicking, at the cost of valuable per-pixel information needed for accurate depth estimation.

Henceforth the image being exposed to the color filter array (CFA) and registered directly by the sensor elements (i.e. before CFA demosaicking) will be referred to as the raw CFA image. The applicant has realized that by capturing the signal before it has been subject to said demosaicking, i.e. by shortcutting the conventional image pipeline, and using the raw CFA image directly, significant improvements in resolution as well as reductions in system complexity and costs are obtained. Moreover, existing hardware components used in other areas of computer imaging, i.e. not specific for 3D imaging, can be re-used for the purpose of 3D imaging when the alternative would have been to design and implement new 3D imaging hardware from scratch.

As will be appreciated by the skilled practitioner, time-multiplexed structured light approaches typically work so that 3D reconstruction is performed pixel-wise, i.e. it is based on the intensities measured in a single pixel at different instances in time. A sequence of patterns is projected onto the scene, and for each projected pattern a corresponding image of the scene is acquired. The applicant has appreciated that since both phase stepping and Gray codes—patterns that are typically used for illumination of 3D surfaces—are based on ratios of such intensities, or comparisons of intensities measured at the same pixel at different instances in time, the difference in response in each pixel due to the color filters is, in fact, canceled out. See e.g. equation 3 for an example that shows how phase stepping is based on a ratio of intensities, and equation 4 shows how the effect of a color filter can be cancelled from the equation.

This means that it is possible to analyze a time series of e.g. Gray code patterns or phase stepped sinusoidal patterns (including combinations of these pattern types) and determine pattern displacement, and hence 3D depth, by analyzing the raw CFA images directly, without the need for color information and hence CFA demosaicking. In other words, it is possible to use the information directly from each sensor element or pixel in a sensor matrix by analyzing the detected illumination variations on each sensor element in the sequence of projected patterns even if the effect of the color filter itself is unknown. This has several benefits, as will be described in the following paragraphs. The information captured directly from the sensor may be represented as an aforementioned raw CFA image containing only grey level information.

The present invention is thus based on the realization that the colors provide a large amount of redundant information if the color is to be taken into account and used as a basis for calculating depth information from a sequence of structured light projections, and that the calculation time may be reduced by omitting the CFA demosaicking during at least most of the structured light sequence. CFA demosaicking may be performed a limited number of times, and possibly only once, during a sequence. The projected pattern sequence may include one pattern with uniform illumination to aid in the sampling of color information, or alternatively, two or more patterns may be used, where each of those patterns contain one or more regions of uniform illumination. For the latter case, the color information corresponding to the regions of uniform illumination may be extracted from each image, and two or more images may be combined in order to calculate the final color image.

There are several advantages of omitting the CFA demosaicking during most of the structured light sequence as will now be described.

Reduced memory footprint and bandwidth requirements: If the CFA demosaicking is performed in a separate thread which does not share memory with the main thread used for 3D depth determination, the raw CFA images must first be copied into the demosaicking thread's memory. After CFA demosaicking, the resulting color images need to be copied back to the main thread's memory. This is illustrated in FIG. 7 and more specifically in FIG. 8. A raw CFA image typically contains H×W×8 bits of information (where H and W is the image height and width, respectively), while a color image (output from the CFA demosaicking) typically contains at least H×W×24 bits of information. It is hence evident that, by omitting the CFA demosaicking, the set of images will require less amount of memory and the total amount of data that needs to be transferred back and forth between the demosaicking thread and the depth determination thread is reduced. The applicant has appreciated that, for instance, using the full set of color channels for depth estimation, i.e. after CFA demosaicking, was practically impossible to implement in real-time on a modern-day PC due to processor and bus limitations. However, by accessing the raw image prior to CFA demosaicking, a fully working system could be realized using industry-available parts.

The need for such data transfer typically occurs if the CFA demosaicking is performed on an external parallel processor, such as, e.g. a Graphics Processing Unit (GPU). It can also be the case if the CFA demosaicking is performed in a separate process or thread on the CPU which do not share memory with the 3D depth determination thread. The latter may be the case if the CFA demosaicking is performed, e.g. in the camera driver.

Improved signal-to-noise ratio: Most methods for CFA demosaicking apply spatial filters to local neighborhoods of pixels in order to extract color information. Typically, spatial filtering or spatial averaging has the intended effect of reducing noise and hence improving the signal-to-noise ratio. However, the said interpolation or the spatial filters employed in conventional imaging systems are designed for improving the quality of a color component image and not a depth map. Hence the filtering process tends to remove key information that could otherwise be employed for accurate depth estimation. The effect could be likened to using a sub-optimal filter in any imaging application where a better and optimal filter is known; the result will be an image with worse characteristics than would be obtained if the best filter was employed. By omitting the CFA demosaicking when calculating 3D depth, i.e. by working directly with the raw image, the interpolation or averaging between neighboring pixels is avoided, enabling subsequent estimation with a better signal-to-noise ratio in the 3D depth map.

Reduced processor load: CFA demosaicking is a rather processor-intensive operation, which usually involves applying aforementioned spatial filters, i.e. convolutions between a so-called kernel (for example a 3×3 or 5×5 matrix) and the image. By omitting the CFA demosaicking the load on the processor may be significantly reduced, and resources are freed that may be used for e.g. increasing the speed in the 3D depth determination or for increasing the speed in the further analysis of the 3D images.

Embodiments of the invention will be described in detail below with reference to the following non-limiting embodiments shown in the accompanying drawings:

FIG. 1 illustrates a color filter array (CFA) with an example "RGGB" Bayer color mosaic layout for arranging the RGB color filters on a square grid covering the photo-sensors of the imaging chip;

According to one embodiment, an image processing system is provided comprising:

a projector adapted to project a pattern towards a scene, the pattern having a temporal variation;

a color image sensor having a plurality of pixels, said image sensor adapted to capture a plurality of video frames of a scene illuminated by said projector; and a processor adapted to receive image data from said image sensor, said image data comprising a plurality of raw values and wherein each raw value of the image data is derived from just one pixel, the processor being further adapted to derive 3D shape information of said scene by calculating depth information for each pixel from determining how the said raw values vary for each pixel over time with the temporally varying projected pattern, the system further comprising an output for a 3D video point cloud of the scene derived from said 3D shape information.

The raw image data can be the intensity value from each pixel. There is no need for the processor to know if the data from a pixel was filtered with a green filter, red filter or blue filter. As will be explained later, since temporal variations are compared on a per pixel basis, any differences in the response of pixels filtered with different colored filters do not affect the result.

Figure 2:
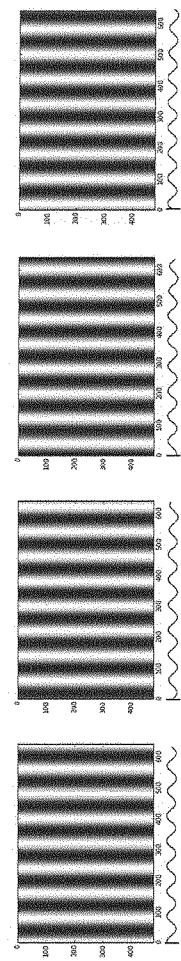
FIG. 2 illustrates four phase shifted cosine patterns, which is an example of a time-multiplexed pattern sequence for structured light.

FIG. 2 illustrates four phase shifted cosine patterns where the intensity horizontally is a cosine shifted, from left to right by 0, 90, 180 and 270 degrees. At the bottom of FIG. 2, a horizontal cross section of the grey level is shown, which illustrates the sinusoidal variation in intensity. Each cosine pattern is laterally displaced by introducing a phase shift, $\Delta\phi_n$. The intensity distribution in such a pattern can be represented as $$I_n(x, y) = A(x, y)[1 + R(x, y)\cos(\phi(x, y) + \Delta\phi_n)] \quad (1)$$

$$\Delta\phi_n = (n - 1)\frac{2\pi}{N}$$

where $A(x, y)$ corresponds to the background illumination, $R(x,y)$ is the object reflectance in each point and N is the number of patterns.

The distortion of the light patterns is encoded in the phase of the cosine, $\phi(x, y)$. This phase can be calculated from the related intensities by the following equation:

$$\phi(x, y) = \arctan\frac{-\sum_{i=1}^{N} I_i(x, y)\sin[(2\pi/N)(i-1)]}{\sum_{i=1}^{N} I_i(x, y)\cos[(2\pi/N)(i-1)]} \quad (2)$$

An especially simple version of this equation is given below for the case of 4 shifted patterns, as discussed in abovementioned C. Reich et al, 2000:

$$\phi(x, y) = \arctan\left(\frac{I_4 - I_2}{I_1 - I_3}\right) \quad (3)$$

Since the equation involves only a ratio between intensities, the background, $I_0$ and the surface reflectance, $R(x,y)$ is effectively canceled out from the equation.

In the same manner, a color filter present on a color imaging sensor can be modelled as a factor, $F(x,y)$, that is constant for each pixel, and it can hence be cancelled from the equation.

$$\phi(x, y) = \arctan\left(\frac{F(x, y)I_4 - F(x, y)I_2}{F(x, y)I_1 - F(x, y)I_3}\right) = \qquad (4)$$

$$\arctan\left(\frac{F(x, y)(I_4 - I_2)}{F(x, y)(I_1 - I_3)}\right) = \arctan\left(\frac{I_4 - I_2}{I_1 - I_3}\right)$$

Figure 4:
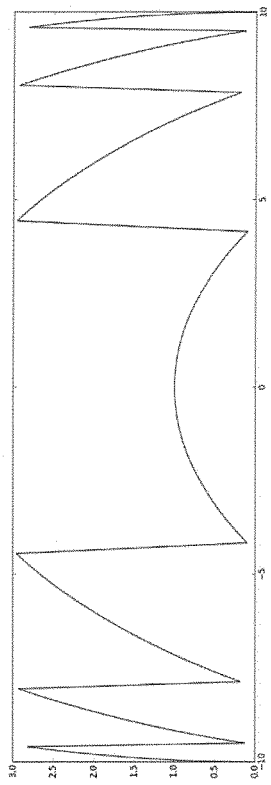
FIG. 4 illustrates a cross section of a 3D image of a half cylinder obtained via phase shifting.

A problem with phase stepping as a method for measuring stripe displacement and hence 3D depth, is that the absolute phase cannot be recovered, but rather a so-called wrapped phase which will always be in the interval [0,2π>. This means that every time the phase exceeds 2π it drops to zero, and the 3D image that is obtained will be only piecewise continuous. See FIG. 4 for a cross section of a 3D image of a half cylinder obtained via phase shifting.

Figure 5:
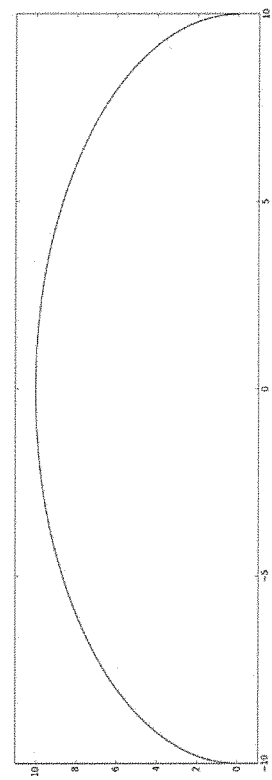
FIG. 5 illustrates the cross section of the same 3D image described in FIG. 4 after phase unwrapping.

A so-called phase unwrapping algorithm can be used to attempt to identify discontinuities in the phase and stitch the piecewise discontinuous segments of the phase together to form a continuous surface. See FIG. 5 for a cross section of the same 3D image after phase unwrapping.

Phase unwrapping algorithms, however, tend to work well only for smooth surfaces. If the object contains e.g. step heights, or several objects are present in the scene at different distances, the phase unwrapping may fail to recover absolute distance for these objects.

Figure 3:
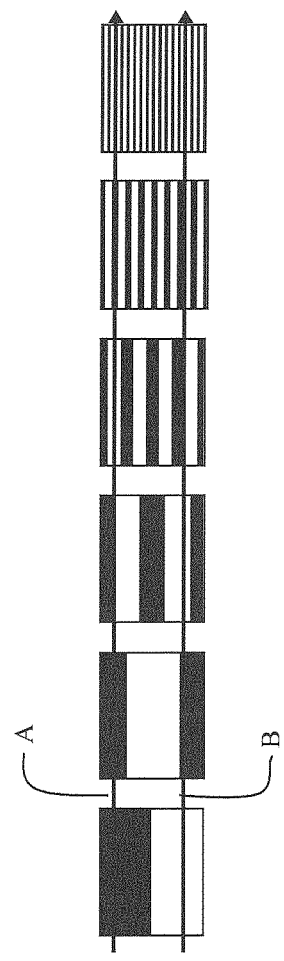
FIG. 3 illustrates a binary pattern sequence consisting of Gray codes for use in embodiments of the present invention.

An alternative structured light method makes use of binary, so-called Gray code patterns as described in the article by Sansoni et al, 1997, mentioned above. The idea is to "tag" each individual stripe with a temporal binary code which gives us the ability to distinguish individual light stripes from each other. The code can be generated by illuminating the scene with a series of binary patterns and by thresholding the sequence of transitions that occur between dark and bright at each location. An example of a Gray code pattern sequence is shown in FIG. 3, where two distinct locations in a planar scene are chosen and the transitions that occur here are followed as a sequence of six binary patterns is projected onto it.

The upper line indicates the transitions that occur at position A, while the lower line indicates the transitions at position B. If darkness is denoted with 0 and brightness with 1, the transitions that occur at position A can be described as the binary word 001100. Likewise, the binary word for position B becomes 101110. Since the code consists of six binary digits, it is possible to distinguish $2^6$=64 separate locations in the pattern.

In an embodiment, a Gray code coding scheme is used which is composed in such a way that successive numbers differ by at most one digit in their binary words. This coding scheme ensures that the error is minimized if one of the transitions is erroneously detected; as described in the articles mentioned above by Sansoni et al, 1997 and Skotheim et al, 2004 for a more thorough explanation.

Optionally, two additional patterns can be projected: one uniform black and one uniform white pattern, and two additional images are acquired: $I_{min}$ (x, y) and $I_{max}$(x, y). This allows normalization for e.g. variations in the object's reflectivity or different response in each individual camera pixel.

Thus, in an embodiment, the projector is adapted to project a white non-patterned frame and a dark non-patterned frame.

However, much of the same effect can be achieved by generating two images $I_{min}(x,y) = \min_{n=1}^{N} I_n(x,y)$ and $I_{max}(x,y) = \max_{n=1}^{N} I_n(x, y)$.

Thresholding is typically done by setting $$T(x, y) = \frac{I_{max}(x, y) + I_{min}(x, y)}{2}.$$

Each bit in the Gray code is determined by setting $b_n$=1 if $I_n(x,y) > T(x,y)$, else $b_n$=0.

The above equation allows a smaller number of patterns to be projected. The above equation allows the patterns to be composed in a way such that, the minimum intensity value (over time) at a specific pixel will correspond to the "dark" frame and the maximum intensity value (over time) corresponds to the "bright" frame.

Hence, the max of the union of the patterns will be all bright, and the min of the union of the patterns will be all dark.

This allows the elimination of the need for the two additional images, Imin(x,y) and Imax(x,y), so the number of patterns can be reduced by 2.

Thus, in a further embodiment, N Gray code patterns are projected to obtain one frame of shape data, wherein the Gray code patterns comprise a variation of two values of illumination, a bright value and a dark value and wherein the patterns are configured such that the minimum intensity value of each pixel measured over the N patterns will correspond to the dark value and the maximum intensity value of each pixel measured over the N patterns corresponds to the bright value. In this further embodiment, each of the Gray code patterns has a mixture of both bright and dark values.

As mentioned above, the patterns may be seen as illumination variations even if the color filtering on the sensor is not taken into account, and thus the 3D information may be calculated directly from the illumination information.

As discussed in the preceding paragraphs, as well as in Skotheim et al, 2004, phase shifting yields only piecewise continuous 3D images, while Gray code patterns yield absolute distance but with relatively poor resolution. When the two methods are combined, such that both a set of phase shifted sinusoidal patterns and a set of Gray code patterns are projected, one can obtain 3D images that are both highly accurate (due to the phase shifting), and do not contain any discontinuities or ambiguities (due to the Gray code).

Thus, in a further embodiment, the projector is adapted to project two different types of temporally varying patterns, wherein one of the types of patterns is adapted to extract data with a high resolution relating to the depth value attributed to a pixel and the other type of pattern is adapted to extract data concerning the exact location of the pixel.

In a further embodiment, the type of pattern adapted to extract data with a high resolution is a pattern that has a continuous variation in its intensity such as a phase shift pattern. Patterns which are adapted to extract data concerning the exact location of the pixel, can be, for example, patterns that assign a digital code to each pixel, for example, binary or Gray code patterns.

In a yet further embodiment, the first type of temporally varying pattern is a Gray code pattern and the second type of temporally varying pattern is a phase shift pattern. However, other types of pattern may be used.

For example, another way to obtain highly accurate 3D images without discontinuities (i.e., to eliminate the need for phase unwrapping), is to use phase shifting with two or more frequencies, as described in Skotheim et. al, 2015. Here, the pattern that provides the high resolution relating to the depth value is the phase shifting pattern, but the accuracy of the location of the pixels can be improved by using the phase shifting at two or more frequencies.

Due to recent advances in projector and camera technology, it has now become possible to project and acquire images at very high frame rates. For example, cameras with standard interfaces (e.g. USB 3.0) are currently available with frame rates of 160 fps or above at >2Mpixel resolution. When combined with highly optimized algorithms that can process a large number of images per second, it is possible to reconstruct 3D images at near video rates, even when a relatively large number of patterns is used. This allows the use of combination methods, such as e.g Gray code and phase shifting or phase shifting with two or more frequencies. For example, if 6 Gray code patterns and 4 phase-shifted sinusoidal patterns are used, it is possible to acquire an entire sequence of 10 patterns 16 times per second, and hence obtain a 3D image frame rate of 16 Hz.

Thus, in an embodiment, the frame rate of the camera is at least 50 frames per second and said 3D video depth map is produced in real time. In a further embodiment, the frame rate of the camera is at least 100 frames per second and the said 3D video depth map is produced in real time.

There are many contributions to the fast processing speed achievable. As the raw data is processed to obtain a 3D point cloud or shape information, only one intensity value per pixel is processed for each pattern. There is no need to transfer data such as the "color" of this pixel. Also, this represents one third of the data that would normally be processed if Bayer mosaicking had been performed. Bayer mosaicked data comprises 3 intensity values per pixel as three color intensity values are given for each pixel. Using only one intensity value per pixel reduces the processing time, but also the time needed to transfer data, all of which significantly contribute to the processing speed and allow the method of the embodiment to perform in real time.

Figure 6:
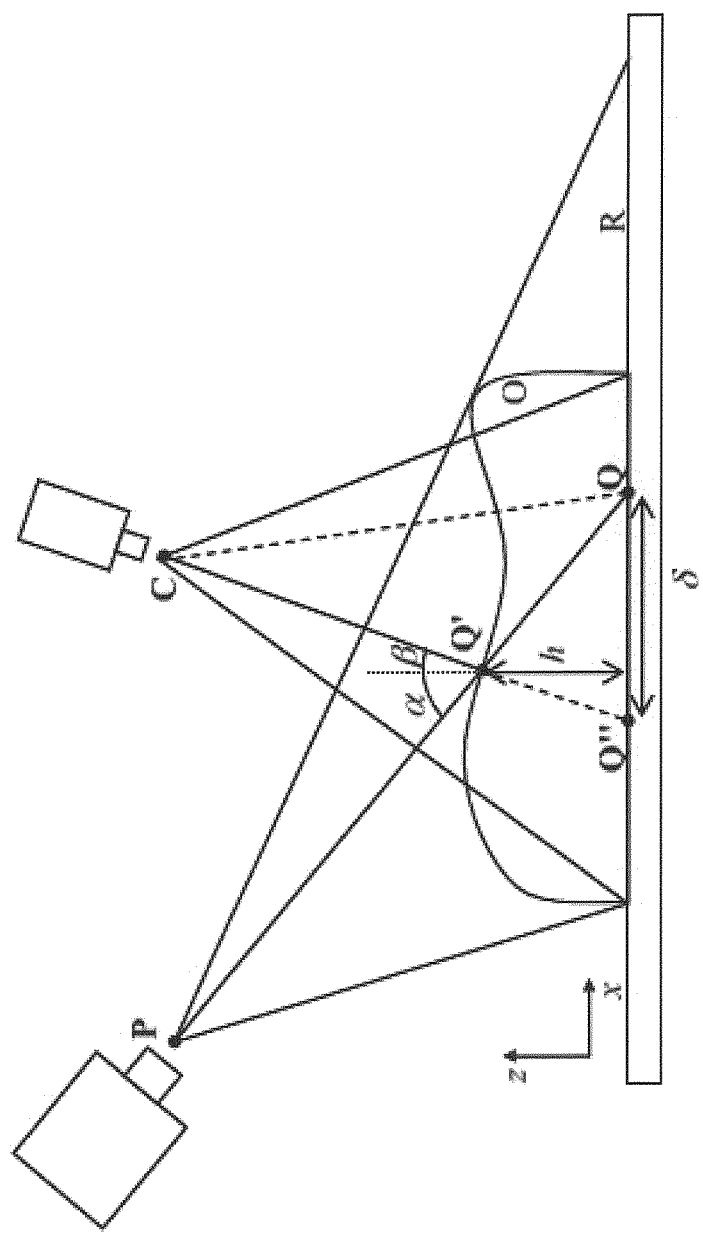
FIG. 6 illustrates an overview of the imaging system.

The system for projecting and detecting the 3D images is per se known and is illustrated in FIG. 6, referring to the article by Skotheim et al, 2004, mentioned above. As may be seen, the projector P projects a pattern on the object O, and a camera C samples images, where the optical axis of the projector P has an angle α+β relative to the optical axis of the camera, as discussed in Skotheim et al 2004. One ray from the projector is drawn from P to a point Q on a planar reference plane R. When an object O is introduced, the ray from the projector intercepts the surface at the point Q' on the object. This is visible in the camera as a displacement δ=Q"Q. It is easy to show that the relation between the displacement δ and the height h in this point is given by:

$$h = \frac{\delta}{\tan\alpha + \tan\beta}$$

Figure 7:
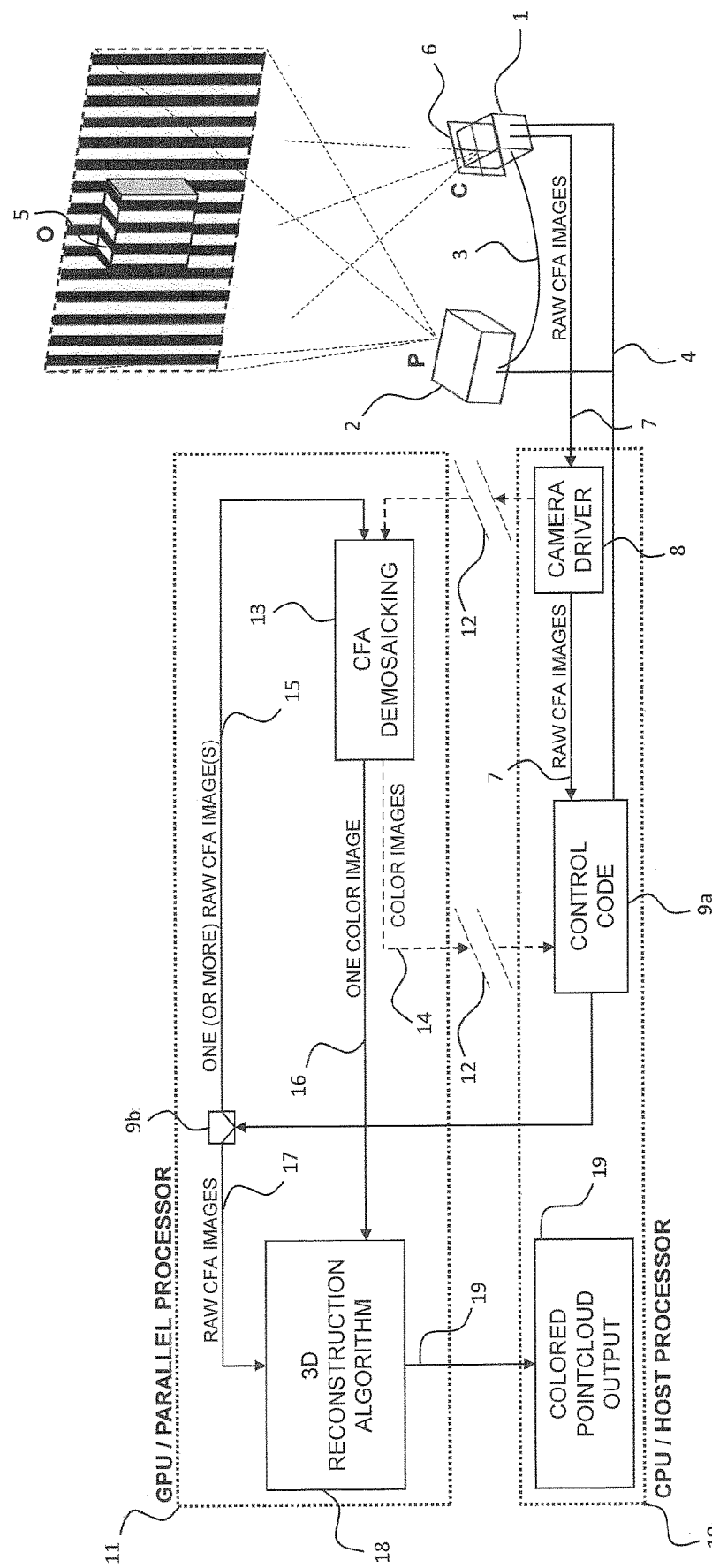
FIG. 7 illustrates a processing pipeline according to an embodiment of the present invention.

The operation of the unit and system according to an embodiment of the present invention may be illustrated as shown in FIG. 7, which is an illustration of a processing pipeline in the case where an external parallel processor (e.g., a GPU) is used for processing the image sequence and determining 3D depth. The data flow and processing is further detailed in FIG. 8. In an embodiment of the present invention, the raw CFA images may be transferred directly to the external parallel processor, without the need for CFA demosaicking of the entire image sequence.

Usually the information from the camera driver is forwarded to a processor producing a color image from each exposure, which means that every projected pattern in a sequence is represented by a color image.

Systems in accordance with embodiments extract the illumination information directly from the raw CFA images. Thus, the illuminated patterns are represented by a sequence of what may be described as grey scale images being basis for the 3D reconstruction algorithm. The 3D reconstruction algorithm can be based e.g. either on phase shifting alone, Gray code patterns alone, a combination of Gray code and phase shifting or phase shifting with more than one frequency. The lattermost two methods are both robust and accurate, and they do not have problems with ambiguities or discontinuities.

In order to provide color images for the purpose of real time imaging of an area, one or more color images may be captured during each sequence based on the filter pattern on the sensor. The color information is preferably sampled in regions of the image that have been exposed to a relatively uniform illumination.

Thus, in an embodiment, the image processing system is adapted to output color 3D point cloud, said color 3D shape information being obtained by combining said 3D shape information with color information.

The reconstructed 3D representation may then be merged with the color image to provide real time 3D color images of an object or object area.

Thus, in an embodiment, the image data from each pixel is combined with data from at least one other pixel to produce an interpolated color frame to produce said color information.

In a further embodiment, the processor is further adapted to process a plurality of frames of image data to obtain one frame of 3D shape information and wherein at least one frame of said plurality of frames is processed to obtain color information.

As explained above, different patterns are projected onto the scene. In one embodiment, the frame that is processed for color information is an "all-white" image. In further embodiments, the raw data of the images from the plurality of frames are combined to produce a combined frame and the combined frame is processed for color information. For example, the maximum intensity of each pixel over the plurality of frames may be used or some other value, for example, the minimum intensity of each pixel over the plurality of frames, the average intensity of each pixel over the plurality of frames etc.

Figure 1:
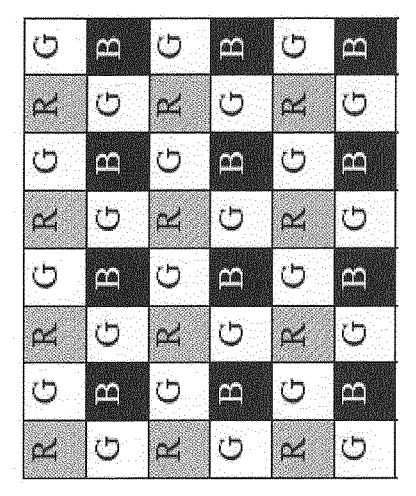

More in detail FIG. 7 shows an embodiment of the invention where the scene is captured by the camera 1,C synchronized with control signals 3 and 4 in conjunction with projection from a projector 2,P upon the scene objects 5,O. The photons first pass through a color filter array 6 (e.g. as shown in FIG. 1) before being converted to a digital signal and sent to the camera driver 8 on the host processor/CPU 10 as raw CFA images 7.

According to the known art discussed above the images could be forwarded 12 to a GPU/parallel processor 11 where each image from the camera could be processed with CFA demosaicking 13, e.g. a Bayer-demosaicking. The image sequence would then be transmitted back 12 to the CPU 10, e.g. as RGB color images 14, for further processing e.g. to provide 3D images.

As discussed above the known processing requires high processing capacity, but also provides large amounts of redundant data, transferred back and forth between different processors.

According to an embodiment, the image data received from the camera C at the camera driver 8 is received as raw CFA images 7, i.e. before demosaicking, and handled by a suitable code 9a and 9b (on the CPU host processor 10 and GPU/parallel processor 11). The selector 9b selects one or more images 15 that are sent to CFA demosaicking 13 (e.g. applying the Bayer demosaicking) and a set of images 17 are sent directly to the 3D reconstruction algorithm 18 based on the measured illumination variations detected at each sensor element in the sensor matrix of the camera, i.e. without taking the color filtering in the camera into account.

One complete image sequence required for providing a 3D image may thus comprise a sequence of raw CFA images and at least one color image. As mentioned above the color image may be obtained in one exposure with uniform illumination (where the uniform illumination is generated either by the projector or by an additional light source) or from uniformly illuminated parts of a set of images.

The sequence of raw CFA images 17 is used for generating a 3D image and combined 18 with at least one color image 16 to provide a 3D color image as an output 19.

Subsequent processing of a number of sequences will provide a 3D movie or, because of the efficiency of the system according to an embodiment of the invention, a real-time 3D monitoring of the objects in the area monitored by the camera.

In practical applications, the object area is thus illuminated from one direction with a known pattern sequence, and a corresponding sequence of images is captured by an image sensor being provided with a color filter array (CFA).

The main part of the captured images is read as illumination information (grey scale information) and the 3D representation is constructed therefrom. In addition, at least one color image is captured for each sequence to provide the full color 3D reconstruction.

As shown in FIG. 7, in an embodiment, the processor comprises a graphical processing unit adapted to perform parallel processing algorithms and said graphical processing unit is adapted to derive 3D shape information of said scene from the raw values.

Further, the processor may comprise a standard processing unit and said standard processing unit directs the said raw values to the graphical processing unit and receives the said 3D shape information output from the graphical processing unit.

As explained above, providing the raw data to the GPU reduces the amount of data that needs to be transferred to the GPU over that compared with Bayer mosaicking. The raw data is one third of the size of the Bayer mosaicked data.

The division between the CPU and GPU in FIG. 7 is used for illustrative purposes for comparison with the known art, and is not necessary for performing an embodiment of the invention (i.e. the entire process may be performed e.g. entirely on the host/CPU).

Figure 8:
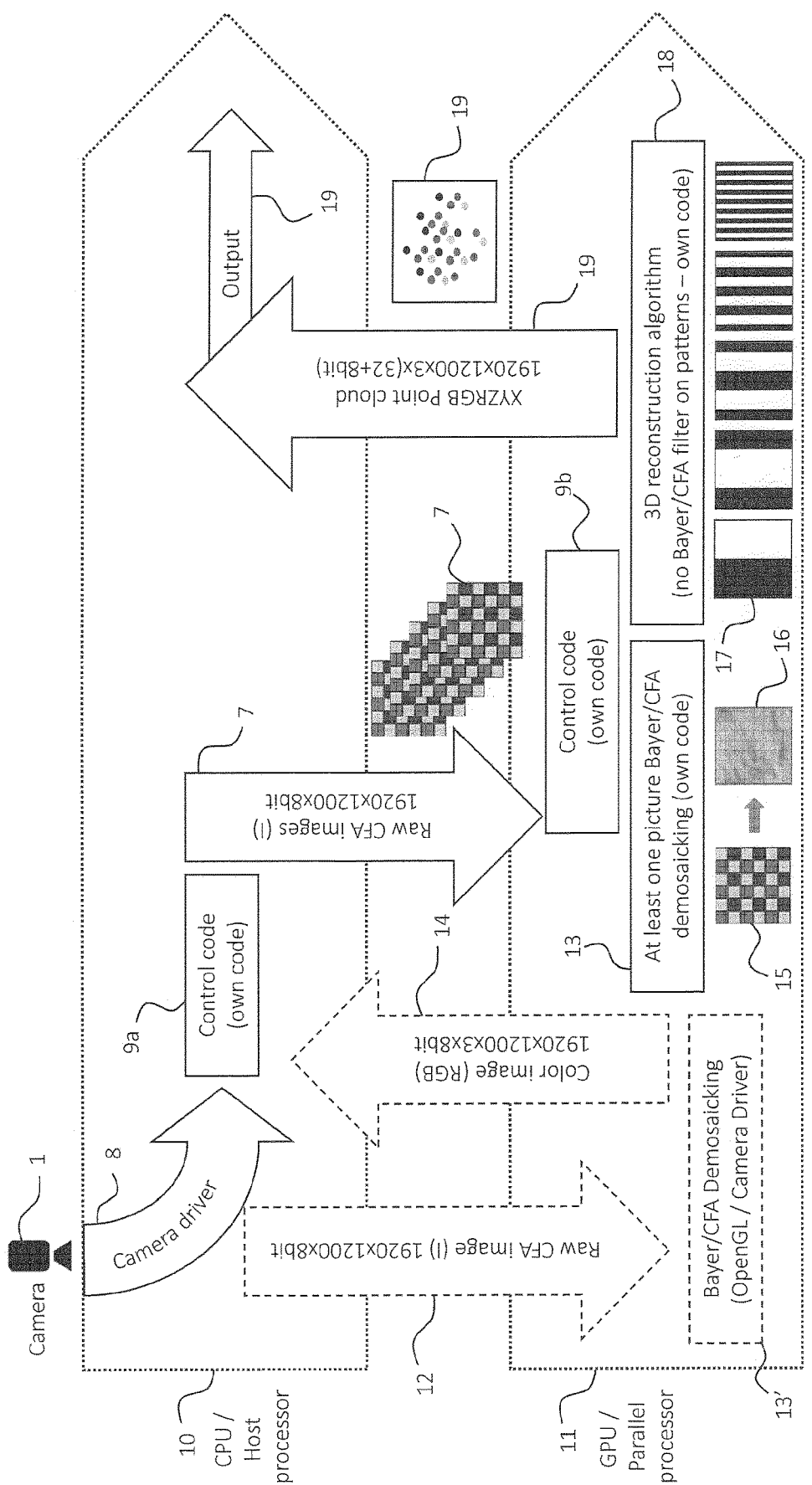
FIG. 8 illustrates the data flow between a graphical processing unit and a standard computer processing unit.

The division between the CPU/host processor and the GPU/parallel processor is shown in more detail in FIG. 8. FIG. 8 shows the data flow and processing that takes place at the CPU 10 and the GPU 11 and the transferring of data between the processors. To avoid any unnecessary repetition like reference numerals have been used to denote like features. It should be noted that the output 19 can be derived from the CPU 10 or directly outputted from the GPU 11.

The camera driver 8 provides the raw data 7 from the camera to the CPU 10. At this point, via the CPU, the raw data is transferred to the GPU 12 for 3D reconstruction 18. At least one picture per frame 15 is selected for Bayer mosaicking 13. This is done purely to obtain the color information 16. The color and 3D shape information is then transferred back to the CPU 10 to be output 19. In an embodiment, the combination of 3D shape and color is performed on the GPU 11. Further, the result of the measurement on the GPU may be a matrix of 1920×1200×7 values, representing a colored point cloud where the 7 values are: x, y, z, contrast and r, g, b. Contrast is a value that indicates the quality of the point (for example, if the pixel was in a shadow area, the contrast will be close to 0).

It should be noted that in this embodiment the elements of the process flow shown with dotted lines are not performed. Thus, the entire raw data set is not transferred via 12 to the GPU 11 for Bayer demosaicking 13'. Further, the entire Bayer demosaicked data is not then returned to the CPU for further processing via 14. Instead, these steps are omitted and the raw data is directed via control code 9a to the GPU 11 for determining the shape. The process is an efficient process due to the omission of elements 12, 13' and 14 of the process flow.

Thus to summarize, embodiments of the invention relate to an imaging unit for obtaining a three dimensional image of an object area 5,O, comprising a camera 1, C with an image sensor constituted by a matrix of sensor elements and a focusing unit for providing an image of said object area onto the image sensor. The matrix being covered by a color filter array (CFA) 6, e.g. a Bayer pattern (illustrated in FIG. 1) or other filter patterns discussed earlier, and a projection unit 2,P for projecting a predetermined pattern toward the object area 5,O, the focusing unit and the projection unit having optical axes differing with a known angle.

The projection unit 2,P is adapted to project a time sequence of patterns toward the object area, the pattern sequence being chosen so as to uniquely define a position along at least one axis perpendicular to the projection axis, over the period defined by the illumination. If the pattern sequence is based on phase stepping the position may be found as a continuous value while other sequences like Gray code «uniquely define a position among a chosen number of positions based on the pattern sequence in each sensor element.

Each sensor element in said matrix is connected through the camera driver 8 to a processing branch 9a, 9b, 17 and 18 for detecting the illumination variations in the sequence measured at each sensor element, e.g. by measuring the signal variations at each sensor element representing the intensity variations through the sequence. The variations over the matrix will then represent the variations in the sequence of images caused by the projected illumination sequence. If as an example the projected pattern sequence is a black and white pattern sequence, the highest intensity detected on a certain sensor element may be registered as "white" and the lowest as "black". Similar with grey scale patterns although including intermediate intensity values. Thus, the data received by the 3D reconstruction algorithm 18 is in the form of so-called raw CFA images (i.e. before demosaicking). The 3D reconstruction algorithm calculates from the known angle between the projection and imaging axes, the position in the sensor matrix, and the illumination sequence detected at each sensor element, a three-dimensional coordinate of the imaged point on the surface of the object.

According to an embodiment, the processing branch is also adapted to extract 9a, 9b at least one image 15 from the image area and to calculate a color image 16 based on said color filter pattern for the sampled image during the sequence. This way the sequence will consist of a number of grey scale images 17 used for reconstructing the 3D shape of the object in the image area and one color image, which in the processing may be combined 19 to provide a 3D color depth map or point cloud output.

The pattern may be a linear pattern consisting of a pattern where the intensity varies along one axis, where the measured illumination sequence in the image plane is detected by each sensor element in said matrix along with the known positions in the matrix defining the 3D position of each illuminated part of the object area, as discussed above.

The projected patterns may be of different types, such as a series of grey scale images (for example a sequence of phase shifted sinusoidal patterns), a binary pattern sequence, such as a Gray code sequence, constituted by two dimensional patterns uniquely identifying a set of positions in the pattern plane or a combination of grey scale and binary patterns (e.g. a combination of a Gray code sequence and a sequence of phase shifted sinusoidal patterns).

The image sequence provided by the processing branch may also in addition include one or more images constituted by combinations of at least two sensor elements, e.g. reducing the pixel number of the images.

The 3D imaging system according to an embodiment of the present invention may be based on the imaging unit as discussed above and be capable of sampling a number of sequences, thus including 3D imaging means being adapted to sample the 3D position of the object area based on the registered illumination sequence sampled by each sensor element. As discussed, the image sensor comprises a color filter array (CFA), e.g. a Bayer pattern (U.S. Pat. No. 3,971,065) illustrated in FIG. 1, and the imaging means is adapted to detect at least one color image in each pattern sequence period. Based on the color and 3D image a 3D color image is calculated for the object area. According to a further embodiment of the invention the system is also capable of sampling a real-time series of 3D color images, and displaying said series in real-time as a result of the efficient imaging process.

In a further embodiment, a method of capturing a 3D point cloud is provided, wherein the method comprises:
- projecting a pattern towards a scene, the pattern having a temporal variation;
- capturing a plurality of video frames of the scene using a color image sensor having a plurality of pixels;
- receiving image data from said image sensor, said image data comprising a plurality of raw values and wherein each raw value of the image data is derived from just one pixel;
- deriving 3D shape information of said scene by calculating 3D point cloud for each pixel from determining how the said raw values vary for each pixel over time with the temporally varying projected pattern; and
- outputting a 3D video point cloud of the scene derived from said 3D shape information.

In a yet further embodiment, a carrier medium is provided comprising computer readable instructions for causing a computer to perform the above method.

The invention claimed is:

1. An imaging system for obtaining a three-dimensional image of an object area, the imaging system comprising:
- an image sensor constituted by a matrix of sensor elements, the matrix being covered by a color filter array, the imaging system being configured to perform a demosaicking operation on at least a portion of image data received by the image sensor;
- a focusing unit for providing an image of said object area on the image sensor; and
- a projection unit for projecting a predetermined pattern toward the object area, the focusing unit and the projection unit having optical axes differing with a known angle;
- wherein the projection unit is adapted to project an illumination sequence comprising a time sequence of patterns toward the object area, wherein said time sequence of patterns includes a sequence of coded patterns that together uniquely identify positions in the whole pattern plane;
- wherein for each sensor element in said matrix, the imaging system is configured to detect the variations in raw image data received by the image sensor during the course of projecting the illumination sequence, wherein the raw image data comprises image data for which the demosaicking operation has not been carried out, and to calculate from the known angle between the projection and imaging axes, the position in the sensor matrix, and the raw image data detected at each sensor element, a three-dimensional coordinate of a point on the surface of the object that is imaged onto the respective sensor element,
- the imaging system being configured to generate a three-dimensional image of the object area based on the three-dimensional coordinates of the points on the surface of the object;
- wherein the imaging system is adapted to perform the demosaicking operation based on at least one image of said object area and calculate a color image based on said at least one image following the demosaicking operation.

2. The imaging system according to claim 1, wherein each pattern is a linear pattern, and the raw image data as detected by each sensor element in said matrix along with the known positions in the matrix, define the three-dimensional coordinate of each point on the surface of the object.

3. The imaging system according to claim 2, wherein said projected patterns are a combination of Gray code patterns and a sequence of phase stepped sinusoidal patterns with at least one frequency.

4. The imaging system according to claim 1, wherein the imaging system is configured to generate the three-dimensional image using one or more images constituted by combinations of at least two sensor elements.

5. The imaging system according to claim 1, wherein the imaging system is configured to detect the intensity variation at each sensor element through the sequence providing a relative illumination sequence representing the illumination measured at the sensor element.

6. An imaging system according to claim 1, adapted to sample a number of sequences, comprising 3D imaging means for in each sequence sampling the 3D position based on registered illumination sequence sampled by each sensor element, wherein the image sensor comprises a color filter array (CFA), also including imaging means for detecting at least one color image in each pattern sequence, and based on said color and 3D image constructing a 3D color image of said object area.

7. An imaging system according to claim 6, being capable of sampling a real-time series of 3D color images, and displaying said series in real-time.

8. An imaging system unit according to claim 1, wherein performing the demosaicking operation comprises estimating, for each sensor element, values for one or more colours that are filtered from being received at the sensor element.

* * * * *